United States Patent
Hansen (10) Patent No.: US 10,464,619 B2
(45) Date of Patent: Nov. 5, 2019

(54) TRACKED UTILITY VEHICLE

(71) Applicant: Clark Equipment Company, West Fargo, ND (US)

(72) Inventor: Ronald S. Hansen, Leonard, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 15/425,671

(22) Filed: Feb. 6, 2017

(65) Prior Publication Data

US 2017/0225725 A1 Aug. 10, 2017

Related U.S. Application Data

(60) Provisional application No. 62/291,850, filed on Feb. 5, 2016.

(51) Int. Cl.

| B62D 55/06 | (2006.01) |
|---|---|
| B60K 13/02 | (2006.01) |
| B62D 1/22 | (2006.01) |
| B62D 11/02 | (2006.01) |
| B62D 33/02 | (2006.01) |
| B62D 33/06 | (2006.01) |
| E02F 9/02 | (2006.01) |
| E02F 9/08 | (2006.01) |

(Continued)

(52) U.S. Cl.
CPC .............. *B62D 55/06* (2013.01); *B60K 13/02* (2013.01); *B62D 1/22* (2013.01); *B62D 11/02* (2013.01); *B62D 33/02* (2013.01); *B62D 33/0617* (2013.01); *B62D 49/02* (2013.01); *E02F 9/02* (2013.01); *E02F 9/0858* (2013.01); *E02F 9/16* (2013.01); *E02F 9/2004* (2013.01); *E02F 9/2087* (2013.01)

(58) Field of Classification Search
CPC ........ B62D 55/06; B62D 11/02; B62D 33/02; E02F 9/02; E02F 9/0858; E02F 9/16; E02F 9/2004; E02F 9/2087
See application file for complete search history.

(56) References Cited

U.S. PATENT DOCUMENTS

| 1,501,795 A | 7/1924 | Mitchell |
|---|---|---|
| 1,543,838 A | 6/1925 | Fogarty |

(Continued)

FOREIGN PATENT DOCUMENTS

| CN | 202225930 U | 5/2012 |
|---|---|---|
| DE | 202004001390 U1 | 5/2004 |

(Continued)

OTHER PUBLICATIONS

International Search Report and Written Opinion dated May 12, 2017 for International Application No. PCT/US2017/016707 filed Feb. 6, 2017, 16 pages.

*Primary Examiner* — Joseph M Rocca
*Assistant Examiner* — Michael R Stabley
(74) *Attorney, Agent, or Firm* — John D. Veldhuis-Kroeze, P.A.; Westman, Champlin & Koehler, P.A.

(57) ABSTRACT

Utility vehicle power machines with a frame, single left and right side tracks or tractive elements, a cab, a box supported toward the rear of the frame, and a lift arm supported toward the front of the frame. The utility vehicle power machines can have removable covers on a front of the frame, forward of the cab to provide access to various components.

15 Claims, 6 Drawing Sheets

(51) Int. Cl.
*E02F 9/16* (2006.01)
*E02F 9/20* (2006.01)
*B62D 49/02* (2006.01)

(56) References Cited

U.S. PATENT DOCUMENTS

| | | | |
|---|---|---|---|
| 1,624,436 A | 4/1927 | Rosemier | |
| 2,694,773 A | 11/1949 | Knapp et al. | |
| 2,897,987 A | 8/1959 | Johansson | |
| 3,178,046 A | 4/1965 | Le Grand | |
| 3,219,212 A | 11/1965 | Billings | |
| 3,327,879 A | 6/1967 | Le Grand | |
| 3,934,134 A | 1/1976 | Wassel | |
| 3,972,430 A | 8/1976 | Forslund | |
| 4,023,030 A | 5/1977 | Teti | |
| 4,103,791 A | 8/1978 | Ullmann | |
| 4,234,908 A | 11/1980 | McGee | |
| 4,309,742 A | 1/1982 | Holm et al. | |
| 4,379,568 A | 4/1983 | Kerkman | |
| 4,401,179 A | 8/1983 | Anderson | |
| 4,442,477 A | 4/1984 | Hennessey | |
| 4,476,954 A | 10/1984 | Johnson et al. | |
| 4,758,932 A | 7/1988 | Coons | |
| 5,086,870 A | 2/1992 | Bolduc | |
| 5,299,857 A * | 4/1994 | Zanetis | E01C 23/088 |
| | | | 111/101 |
| 5,308,279 A * | 5/1994 | Grinberg | B60H 1/00378 |
| | | | 454/139 |
| 5,375,348 A | 12/1994 | Kishi | |
| 5,377,432 A | 1/1995 | Kishi | |
| 5,442,527 A | 8/1995 | Wichelt | |
| 5,551,826 A | 9/1996 | Todd et al. | |
| 5,924,516 A | 7/1999 | Sagaser et al. | |
| 6,030,169 A * | 2/2000 | Rossow | B60K 28/04 |
| | | | 180/273 |
| 6,071,066 A | 6/2000 | Braud | |
| 6,199,646 B1 | 3/2001 | Tani et al. | |
| 6,289,783 B1 | 9/2001 | Sagaser et al. | |
| 6,447,152 B1 | 9/2002 | Goebert | |
| 6,523,905 B2 | 2/2003 | Tamura et al. | |
| 6,543,563 B1 | 4/2003 | Muraro | |
| 6,668,964 B2 | 12/2003 | Braud | |
| 6,729,830 B2 * | 5/2004 | Wagner | E02F 3/283 |
| | | | 414/686 |
| 6,869,153 B2 | 3/2005 | Wright et al. | |
| 6,896,088 B2 * | 5/2005 | Dahl | B60K 31/10 |
| | | | 180/305 |
| 6,910,731 B2 | 6/2005 | Albright et al. | |
| 6,918,689 B2 | 7/2005 | Schmidt | |
| 7,160,076 B2 * | 1/2007 | Curl | E02F 3/388 |
| | | | 172/481 |
| 7,334,658 B2 | 2/2008 | Berg et al. | |
| D572,277 S | 7/2008 | Pinther et al. | |
| 7,412,315 B2 | 8/2008 | Wildey et al. | |
| 7,438,147 B2 * | 10/2008 | Kato | B60K 17/34 |
| | | | 180/68.1 |
| D600,721 S | 9/2009 | Shimomura et al. | |
| 7,614,842 B2 * | 11/2009 | Ellefson | E02F 3/283 |
| | | | 298/17 R |
| D621,423 S | 8/2010 | Nakanishi et al. | |
| 7,831,364 B2 * | 11/2010 | Bertsch | E02F 9/2004 |
| | | | 37/414 |
| 7,841,423 B2 | 11/2010 | Damm et al. | |
| 7,857,017 B2 | 12/2010 | Thompson | |
| 8,042,628 B2 * | 10/2011 | Bordini | B60K 17/04 |
| | | | 180/371 |
| 8,070,334 B2 | 12/2011 | Yomogita et al. | |
| 8,100,217 B2 | 1/2012 | Crombez | |
| 8,146,704 B2 | 4/2012 | Ruhter et al. | |
| 8,392,075 B2 * | 3/2013 | Mindeman | E02F 3/3695 |
| | | | 701/50 |
| 8,430,014 B2 | 4/2013 | Burton | |
| 8,430,195 B2 | 4/2013 | Jansen et al. | |
| 8,464,819 B2 | 6/2013 | Major et al. | |
| D685,394 S | 7/2013 | Nagata et al. | |
| 8,573,336 B2 | 11/2013 | Arulraja et al. | |
| 8,585,098 B2 * | 11/2013 | Lundgren | E02F 3/3654 |
| | | | 285/124.2 |
| 8,608,356 B1 | 12/2013 | McGean | |
| 8,695,722 B2 | 4/2014 | Fukazawa et al. | |
| 8,727,588 B2 | 5/2014 | Miyasaka et al. | |
| D707,261 S | 6/2014 | Caboret et al. | |
| 8,794,358 B2 | 8/2014 | Hansen | |
| D715,331 S | 10/2014 | Hutchinson et al. | |
| 9,045,882 B2 | 6/2015 | Major et al. | |
| 2002/0074179 A1 * | 6/2002 | Brandt | B62D 7/1509 |
| | | | 180/252 |
| 2003/0070861 A1 * | 4/2003 | Dahl | B62D 21/186 |
| | | | 180/312 |
| 2003/0073400 A1 | 4/2003 | Dahl et al. | |
| 2005/0270778 A1 | 12/2005 | Hicok et al. | |
| 2007/0216180 A1 | 9/2007 | Hanson et al. | |
| 2009/0192682 A1 | 7/2009 | Ciarla et al. | |
| 2012/0189418 A1 | 7/2012 | Husson et al. | |
| 2012/0208446 A1 | 8/2012 | Taylor et al. | |
| 2012/0301259 A1 | 11/2012 | Husson et al. | |
| 2013/0001984 A1 | 1/2013 | Spencer | |
| 2013/0173117 A1 | 7/2013 | Bertsch et al. | |
| 2013/0344792 A1 | 12/2013 | Hill | |
| 2014/0138066 A1 | 5/2014 | Bibb, III et al. | |
| 2014/0158440 A1 | 6/2014 | Haar et al. | |
| 2014/0338991 A1 | 11/2014 | Hansen | |

FOREIGN PATENT DOCUMENTS

| | | |
|---|---|---|
| EP | 0150154 A2 | 7/1985 |
| JP | H10280477 A | 10/1998 |
| JP | 2000344008 A | 12/2000 |

\* cited by examiner

TRACKED UTILITY VEHICLE

CROSS-REFERENCE TO RELATED APPLICATION

The present application is based on and claims the benefit of U.S. provisional patent application Ser. No. 62/291,850, filed Feb. 5, 2016, the content of which is hereby incorporated by reference in its entirety.

BACKGROUND

The present disclosure is directed toward power machines. More particularly, the present disclosure is related to utility vehicles. Utility vehicles, for the purpose of this discussion, include vehicles capable of performing a variety of different tasks, including digging, carrying material, and the like.

The discussion above is merely provided for general background information and is not intended to be used as an aid in determining the scope of the claimed subject matter.

SUMMARY

This Summary and the Abstract are provided to introduce a selection of concepts in a simplified form that are further described in the Detailed Description. The Summary and the Abstract are not intended to identify key or essential features of the claimed subject matter.

Disclosed are utility vehicle power machines with a frame, single left and right side tracks or tractive elements, a cab, a box supported toward the rear of the frame, and a lift arm supported toward the front of the frame.

In one embodiment, a utility vehicle is disclosed. The utility vehicle has a frame including an engine compartment for supporting an engine in which the engine and a power source for a drive system are mounted. A cab is supported by the frame and is configured to provide an operator station for an operator of the utility vehicle. A lift arm carrier is positioned forward of the cab and the engine compartment and a lift arm is operably coupled to the lift arm carrier and extending forward therefrom, the lift arm configured to be moved relative to the frame under power. A box is coupled to the frame and positioned rearward of the cab, the box being positioned above at least a portion of the engine compartment. First and second single track tractive elements are each coupled to the frame and to the drive system power source, and positioned on opposite sides of the frame.

In other embodiment a utility vehicle is disclosed. The utility vehicle has a frame including an engine compartment for supporting an engine in which the engine and a power source for a drive system are mounted. A cab is supported by the frame and is configured to provide an operator station for an operator of the utility vehicle. The cab is positioned over at least a part of the engine compartment. A lift arm is pivotally mounted to the frame and operable to move relative to the frame under power. First and second tractive elements are each coupled to the frame and the drive system power source, the first and second tractive elements being positioned on respective first and second sides of the frame. A heating, ventilation, and air conditioning system for conditioning air in the cab is mounted to the frame at a position forward of the cab.

In yet another embodiment, a utility vehicle is disclosed. The utility vehicle has a frame and a cab supported by the frame, the cab having an operator station for an operator of the utility vehicle. A lift arm carrier is mounted to a front end of the frame forward of the cab, the lift arm carrier being configured to receive and pivotally mount each of a plurality of different lift arms, each of the lift arms having a different geometry. The lift arm carrier is configured to move an attached lift arm under power. A box is coupled to the frame and positioned rearward of the cab. First and second tractive elements are coupled to the frame and positioned on opposite sides of the frame.

In yet another embodiment, a power machine is disclosed. The power machine has a frame, an engine supported by the frame, a traction system operably coupled to the engine and selectively operated to propel the power machine over a support surface. A controller is in communication with the traction system for controlling operation of the traction system. The controller is capable of communicating with a first operator input and a second operator input for controlling steering of the power machine and the controller is configured to select one of the first and second operator inputs for controlling the steering of the power machine.

In yet another embodiment, a method of controlling the steering of a power machine is disclosed. The method includes selecting, from a first and second operator input, a steering control input for receiving steering control signals from an operator. The method then receives steering control signals from the selected steering control input and provides a steering control signal to a traction system to steer the power machine.

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

The present disclosure is directed toward power machines with a cab providing an operator station, and a box rearward of the cab configured to haul or carry materials, tools, or other items. Power machines, for the purposes of this discussion, include a frame, at least one work element, and a power source that is capable of providing power to the work element to accomplish a work task. In exemplary embodiments, the power machine is a utility vehicle.

Figure 1:
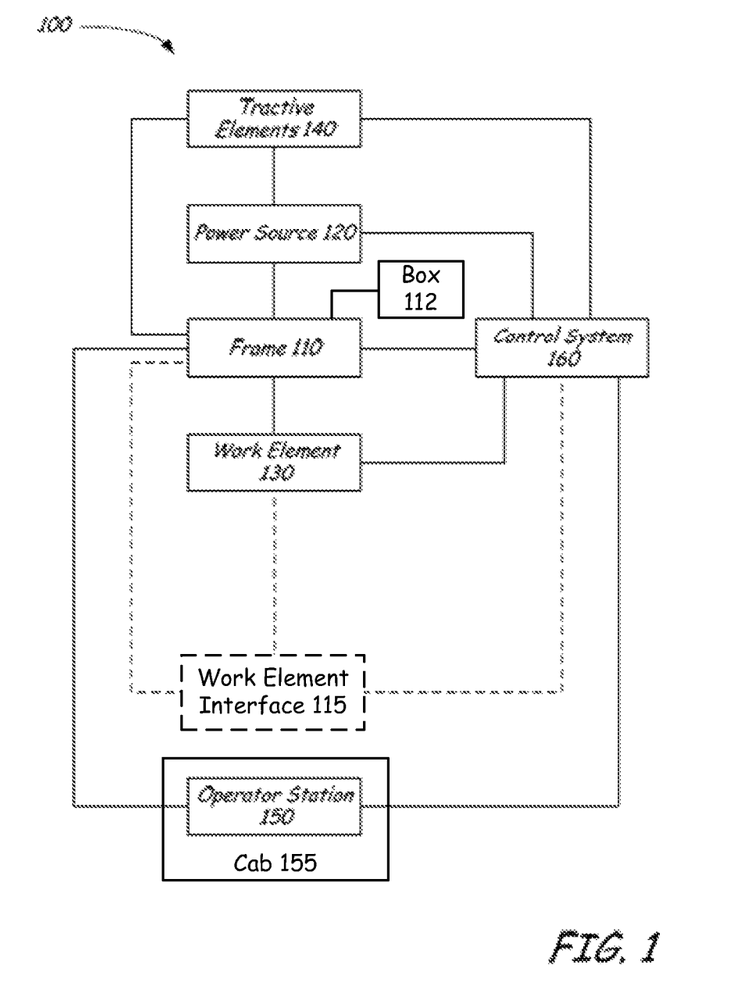
FIG. 1 is a block diagram illustrating functional systems of a representative utility vehicle power machine on which embodiments of the present disclosure can be advantageously practiced.
Figure 2:
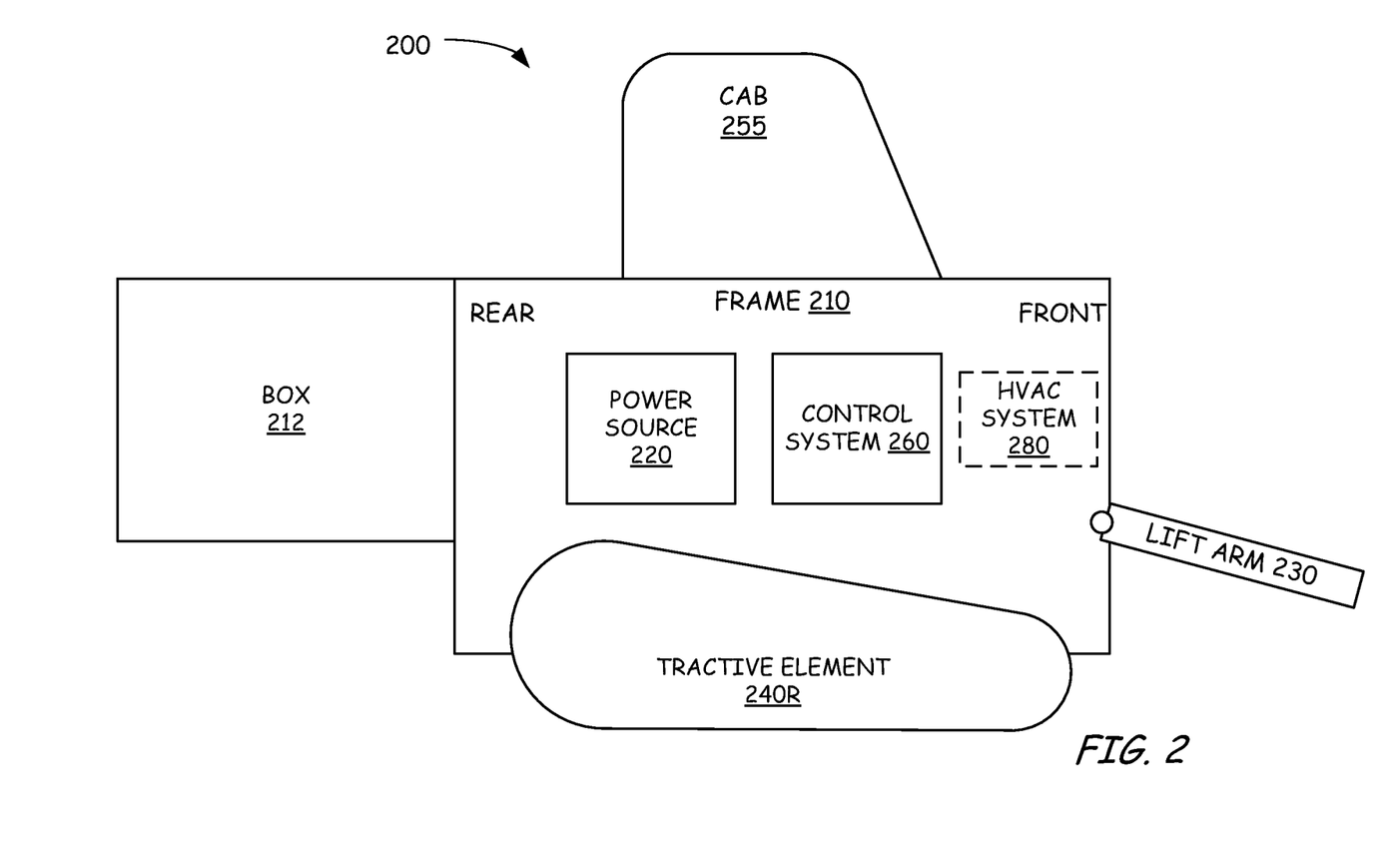
FIG. 2 is a block diagram illustrating a right side diagrammatic view of an illustrative embodiment of a utility vehicle having track assemblies as tractive elements.
Figure 3:
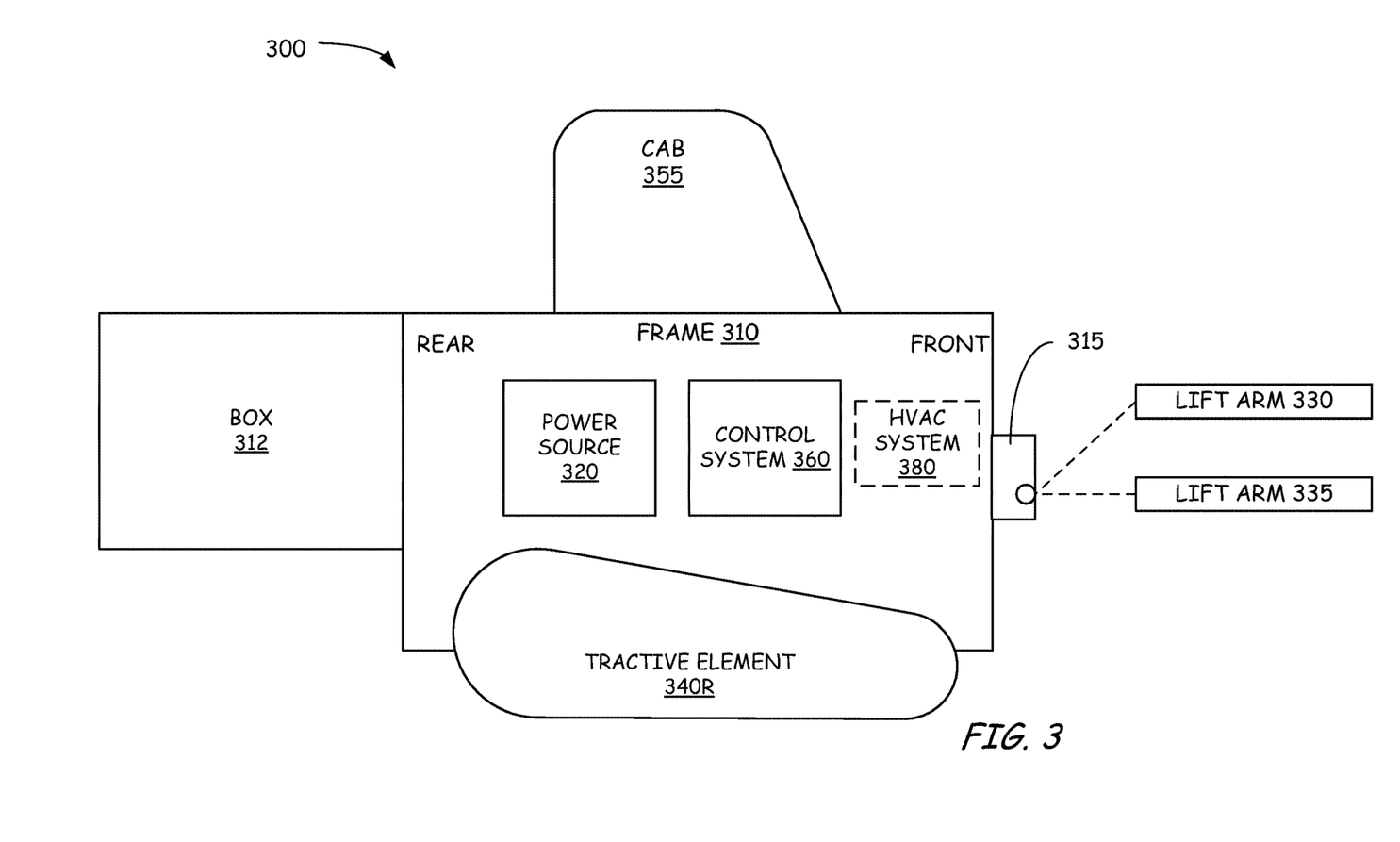
FIG. 3 is a block diagram illustrating a right side diagrammatic view of another embodiment of a utility vehicle having track assemblies as tractive elements.

FIG. 1 is a diagram illustrating various components and systems of a representative power machine 100 on which the embodiments discussed below can be practiced. FIGS. 2-3 illustrate embodiments of such power machines 200, 300.

The power machine 100 of FIG. 1 has a frame 110, a power source 120, and one or more work elements 130. In exemplary embodiments described below, power machine 100 includes a work element 130 in the form of a lift arm operably coupled at or near the front of frame 110. In some exemplary embodiments, the power machine 100 also includes a work element interface 115 in the form of a lift arm carrier that allows multiple different work elements, in particular multiple different types or sizes of lift arms, to be interchangeably attached to and operated at the front of power machine 100.

Because power machine 100 shown in FIG. 1 is a self-propelled power machine, it also has tractive elements 140, which are themselves work elements provided to move the power machine over a support surface. The tractive elements 140 are, in exemplary embodiments, a single left side tractive element 140L and a single right side tractive element 140R (collectively shown as tractive elements 140 in FIG. 1).

Also illustrated in FIG. 1 is an operator station 150 that provides an operating position for controlling the work elements of the power machine. In exemplary embodiments described below in greater detail, operator station 150 includes a cab 155 supported by frame 110. Also supported by the frame of power machine 100 is a box 112 at the rear of the machine for carrying loads. In some embodiments, the box 112 is moveable with respect to the frame 110 to allow material to be dumped from the box. A control system 160 is provided to interact with the other systems to perform various work tasks at least in part in response to control signals provided by an operator.

Certain power machines have work elements that are capable of performing a dedicated task. For example, power machine 100 has, in exemplary embodiments, a lift arm to which an implement, such as a bucket, is attachable such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a power machine, the bucket is intended to be attached and under use. Such power machines may be able to accept other implements by disassembling the implement/work element combination and reassembling another implement in place of the original bucket. Other power machines, however, are intended to be used with a wide variety of implements and the lift arm can include an implement carrier to facilitate attachment of multiple different types of implements to the lift arm. At its most basic, such an implement carrier (not shown) is a connection mechanism between the lift arm and an implement.

Frame 110 includes a physical structure that can support various other components that are attached thereto or positioned thereon. The frame 110 can include any number of individual components. Frame 110 supports the power source 120, which is capable of providing power to one or more work elements 130 including the lift arm and one or more tractive elements 140, as well as, in some instances, providing power for use by an attached implement via an implement interface on the lift arm. Power from the power source 120 can be provided directly to any of the work elements 130, tractive elements 140, and implement interfaces. Alternatively, power from the power source 120 can be provided to a control system 160, which in turn selectively provides power to the elements that are capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. In exemplary embodiments discussed below in greater detail, lift arm work elements can be attached to the frame at the front of the power machine or attached to a lift arm carrier at the front of the power machine. In other embodiments, other work elements can be attached to the frame of the power machine or to the lift arm, and can be movable with respect to the frame or lift arm when performing a work task.

In addition, tractive elements 140 are a special case of work element in that their work function is generally to move the power machine 100 over a support surface. Tractive elements 140 are shown separate from the work element 130 because many power machines, including embodiments discussed below, have additional work elements besides tractive elements, although that is not always the case. As discussed above, in exemplary embodiments, tractive elements 140 are embodied as a single left side tractive element 140L and a single right side tractive element 140R, each mounted to the frame, for example rigidly or through suspension assemblies (not separately shown).

Referring now to FIG. 2, shown in a block diagram format is a right side diagrammatic view of utility vehicle power machine 200, which is an exemplary embodiment of power machine 100 shown in FIG. 1. As shown in FIG. 2, power machine 200 includes a frame 210 having a front and a rear. Coupled to the frame are single left and right side tractive elements or tracks 240R and 240L. Tractive element 240L is not shown in the right side view of FIG. 2, but is of the same type as tractive element 240R. Tractive elements 240L, 240R are rigidly or moveably mounted to the frame 210 and are selectively operable to cause the power machine 200 to move over a support surface. By movably mounted, it is understood that the tractive elements 240 can be mounted such as by torsional mounts to provide suspension between the tractive elements and the frame 210. Whether or not the tractive elements 240 are mounted rigidly or via a suspension, it should be appreciated that the tractive elements are rigidly mounted in the sense that they are unable to pivot under control of the operator to perform a steering function. Rather, the tractive elements 240 can be made to operate against each other to cause the power machine 200 to turn by skidding over a support surface. Frame 210 supports a power source 220, which can be any of the power sources discussed above with reference to power source 120, and a control system 260 which is an embodiment of control system 160. Among other things, the power source 220 is operably coupled to the tractive elements 240 to selectively power the tractive elements 240. The control system 260 includes operator controls that are manipulable to control movement of the power machine, including direction and speed of travel. In various embodiments, different suitable operator controls can be used to provide signals to control direction and speed of travel. At or toward the top of the frame, for example at a position between the front and rear ends of the frame, frame 210 supports cab 255 in which the operator station is provided and where operator controls can be advantageously positioned. In exemplary embodiments, a box 212 is attached to or supported by frame 210 at a rear end of the frame. Box 212 is an embodiment of box 112 described above. Box 212 can be rigidly mounted to the frame or can be capable of being tilted to dump material that may be positioned within the box.

In some exemplary embodiments, power machine 200 includes a heating, ventilation, and air conditioning (HVAC) system 280 at or near the front of frame 210, with the engine or other power source 220 rearward of the HVAC system. More specifically, HVAC system 280 can be forward of, and spaced apart from (i.e. outside of an engine compartment), the engine and power source.

In the embodiment illustrated in FIG. 2, a lift arm 230 is directly pivotably mounted to the front end of frame 210 and power machine 200. Along with the single track tractive elements, this provides advantageous and unique functionality to a utility vehicle, allowing the utility vehicle to perform functions of a loader, while also providing the benefits of a utility vehicle. For instance, while being capable of performing work functions similar to that performed by a loader using lift arm 230, utility vehicle 200 can haul or carry materials, tools, or other items in utility vehicle box 212. Also, while loaders include operator stations configured to carry a single operator, cab 255 can in some embodiments include seating for carrying an operator and one or more additional passengers.

Referring now to FIG. 3, shown in a block diagram format is a right side diagrammatic view of utility vehicle power machine 300, which is another exemplary embodiment of power machine 100 shown in FIG. 1. Utility vehicle power machine 300 includes similarly numbered features and components to those illustrated in FIG. 2, and those similarly numbered components are not separately discussed. For example, frame 310, tractive element 340R, power source 320, cab 355, box 312, control system 360, and HVAC system 380 can be as described above with reference to frame 210, tractive element 240R, power source 220, cab 255, box 212, control system 260, and HVAC system 280.

Power machine 300 shown in FIG. 3 includes a lift arm carrier 315 attached to or supported by frame 310 at the front end. The lift arm carrier is an embodiment of work element interface 115 shown in FIG. 1 and is configured to mount different lift arm types, sizes, etc. to power machine 300. For example, as shown, using lift arm carrier 315, both of a first lift arm 330 of a first size or type, and a second lift arm 335 of a second size or type, can be mounted (one at a time) to the front end of the utility vehicle power machine. The lift arm carrier 315 can be pivotably mounted to the frame 310 and be configured to rigidly mount a lift arm to the carrier, or the lift arm carrier can be rigidly mounted to the frame and configured to pivotably mount a lift arm to the carrier. By including lift arm carrier 315, different types or sizes of lift arms can be interchangeably coupled to power machine 300 and powered by power source 320 and control system 360, to provide a wide range of functionality to the power machine. Lift arms of the type employed on loaders or other loader type vehicles are often movable relative to the frame of a loader under power from one or more actuators such as hydraulic cylinders, with at least one of the actuators being mounted to the frame of the machine. In some embodiments, lift arms 330 and 335 have actuators mounted thereon that will also necessarily need to be mounted to the frame of the machine. Thus, the lift arm carrier 315 will be configured to accept one or more actuators for mounting thereon. In addition, actuators of the type used on lift arms require a power source such as pressurized hydraulic fluid for control of the actuators. The lift arm carrier 315 also includes a connection to a power source on the machine such as hydraulic couplers (not shown) to selectively provide hydraulic pressure to actuators on the lift arm.

Figure 4:
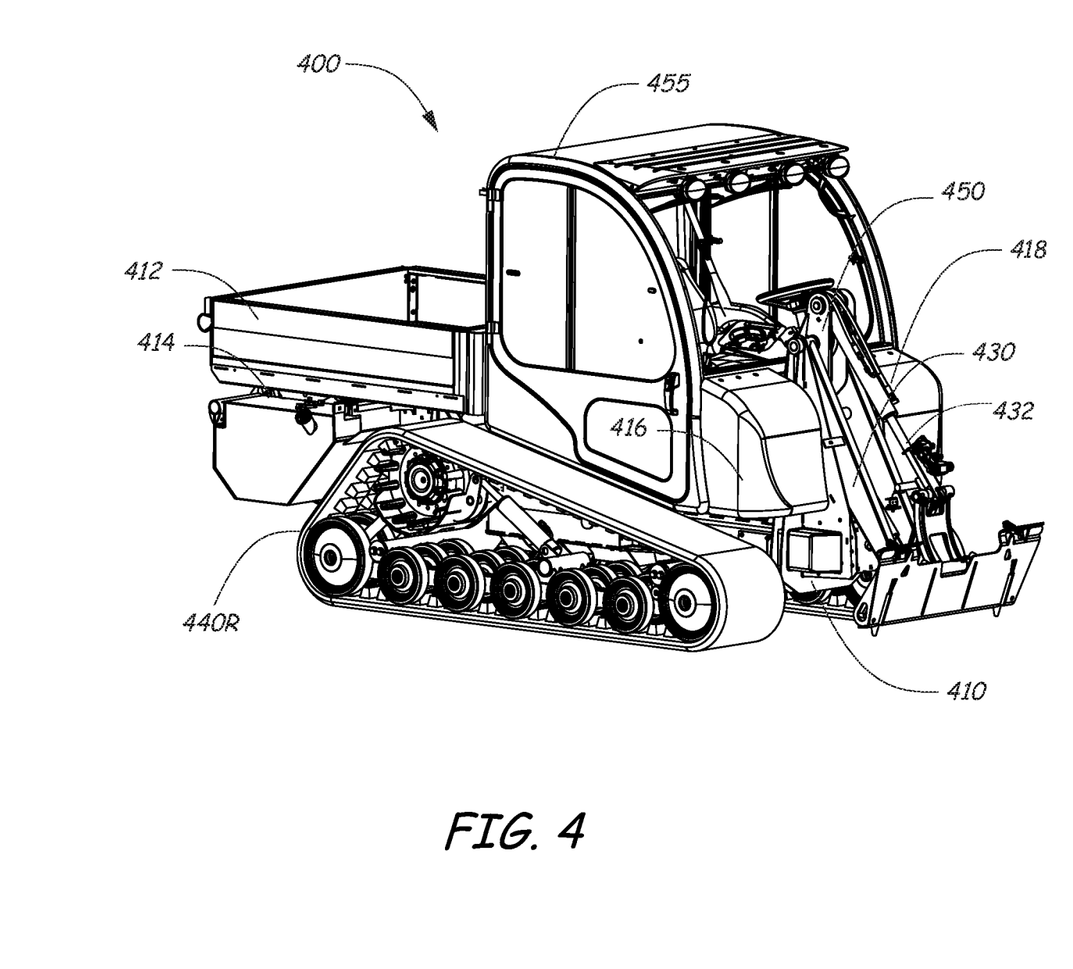
FIG. 4 is an illustration of a utility vehicle incorporating the concepts illustrated in FIG. 2.

FIG. 4 illustrates a power machine 400, which includes features similar to those outlined in the block diagram of FIG. 2. Namely, power machine 400 has a frame 410, upon which is mounted a cab 455, a box 412 and a lift arm 430. In addition, a tractive element 440R is shown and another tractive element 440L (shown in FIG. 5) is mounted to the frame 410 on an opposing, left side of the power machine. Power machine 400 is a utility vehicle with a power source (not shown) and a control system (not shown). An engine compartment is positioned within the frame 410 at least partially beneath the box 412 such that rotation of the box about an axis 414 provides access to the engine compartment. In some embodiments, the engine compartment extends beneath the cab. The power machine 400 in FIG. 4 shows a pair of covers 416 and 418 on the front side of the frame. The covers 416 and 418 are removable to allow access to the space beneath the space. These covers are positioned on opposing sides of the lift arm 430. Various components are advantageously located in front of the cab and accessible by removing these covers as discussed in more detail below. A lift arm carrier 450 is positioned forward of the cab 455. Lift arm 430 and tilt cylinder 432 are operably coupled to the lift arm mount 450. Lift arm 430 is a radial path lift arm. That is, the lift arm 430 is moves along a generally radial path in response to actuation of a lift arm cylinder (not shown). Lift arm 430 can be replaced on the lift arm carrier 430 by a lift arm of a different geometry and/or size so that the same utility vehicle power machine 400 can be equipped with different lift arms.

Figure 5:
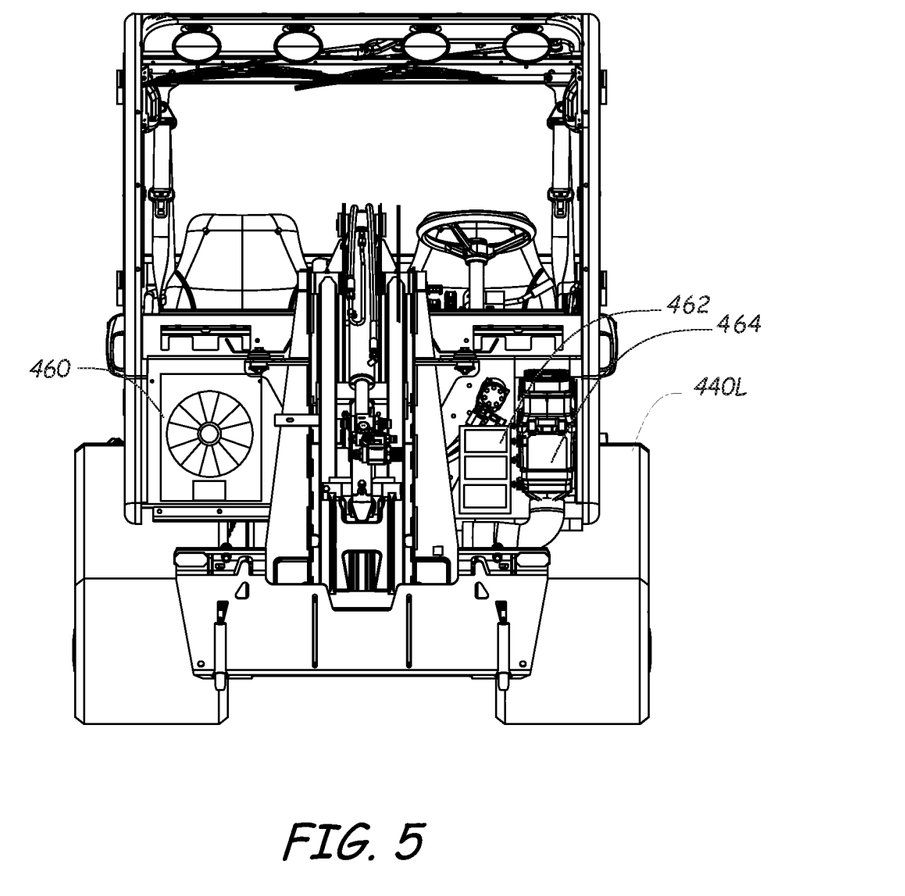
FIG. 5 is a perspective view of the utility vehicle of FIG. 4 showing access covers removed on a front side of the vehicle showing components mounted behind the covers.

FIG. 5 illustrates power machine 400 with covers 416 and 418 (shown in FIG. 5) removed. On one side of the lift arm an HVAC system 460 is coupled to the frame. HVAC system 460 is advantageously positioned forward of the cab and outside of the engine compartment to provide a mounting location that is close to the cab as well as isolated from heat generated in the engine compartment. In addition, mounting the HVAC system 460 in front of the cab and eases space requirements inside of the engine compartment. On another side of the lift arm is a battery 462 and an air cleaner 464. Each of these components is also positioned outside of the engine compartment, thereby allowing for easy access for routine maintenance by simply removing the access cover.

Figure 6:
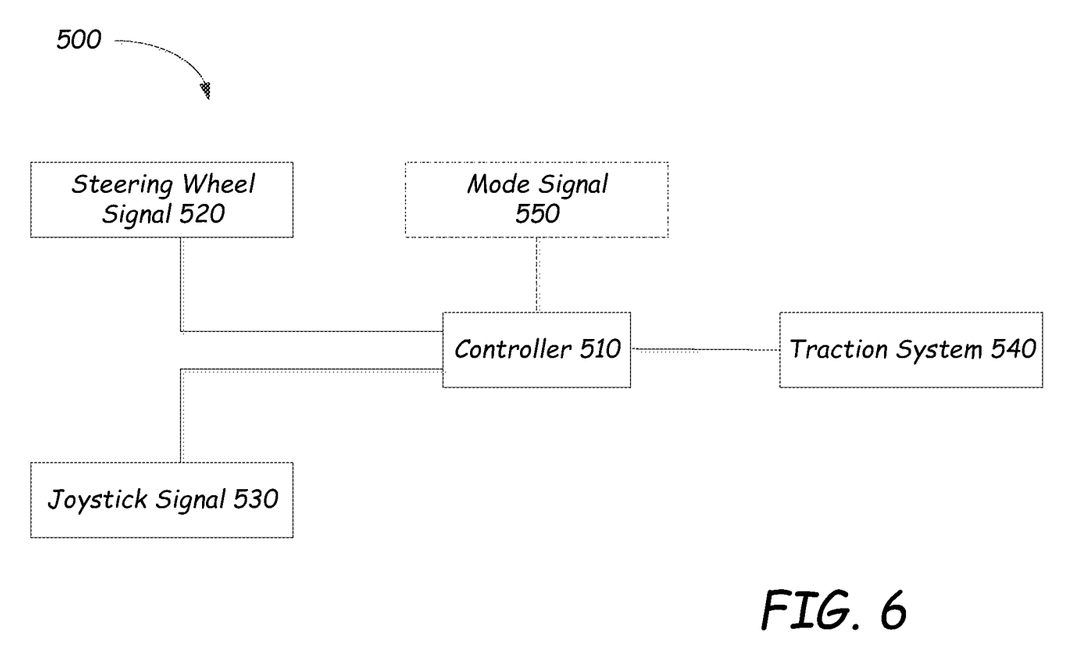
FIG. 6 is a block diagram of a steering control system for a utility vehicle of the type discussed herein according to one illustrative embodiment.

FIG. 6 illustrates a steering control system 500 for controlling the steering of the power machine 400 according to one illustrative embodiment. Steering control system 500 includes a controller 510 that is in communication with a steering wheel signal 520 and a joystick signal 530. In some cases, a power machine may have one or the other of the steering wheel signal and the joystick signal provided to the controller 510 and the controller 510 may be equipped to sense which of the joystick control signal 530 and the steering wheel signal 520 is present and use the signal provided to control the traction system 540. In other embodiments, both the steering wheel signal 520 and the joystick control signal 530 can be present and a model signal 550 can be provided to select one or the other of the steering and joystick control signals to use to control the traction system 540 to control steering of the power machine. A method of controlling the steering of the power machine, then, in some embodiments, includes determining what operator input is providing a steering control signal (i.e. joystick or steering wheel), receiving the steering signal and then controlling the traction system to steer the machine. The determination of what operator input is providing a steering control signal can be accomplished by sensing the presence of one or both of a first and second device (i.e. a steering wheel and a joystick) that can provide operator input signals. This sensing can be made, for example, by sensing CAN or other serial communication from either or both device. In the event that both are present, the method can select one or the other either through a priority scheme (for example, the steering wheel can have precedence over the joystick or vice versa) or through the recognition of a signal from a mode switch that an operator can actuate to select one or the other.

Although the present invention has been described with reference to preferred embodiments, workers skilled in the art will recognize that changes may be made in form and detail without departing from the spirit and scope of the invention.

What is claimed is:

1. A utility vehicle, comprising:
   a frame including an engine compartment for supporting an engine, the engine and a power source for a drive system being mounted therein;
   a cab supported by the frame and configured to provide an operator station for an operator of the utility vehicle;
   a lift arm positioned forward of the cab and the engine compartment and configured to be moved relative to the frame under power;
   a box coupled to the frame and positioned rearward of the cab, the box being positioned above at least a portion of the engine compartment;
   first and second single track tractive elements each coupled to the frame and to the drive system power source, and positioned on opposite sides of the frame; and
   an air cleaner and a heating, ventilation, and air conditioning (HVAC) system each mounted to the frame at positions forward of the cab, with the air cleaner being positioned on a first side of the lift arm and the HVAC system being positioned on a second side of the lift arm.

2. The utility vehicle of claim 1, and further comprising a heating, ventilation, and air conditioning (HVAC) system mounted to the frame at a position forward of the cab.

3. The utility vehicle of claim 1 and further comprising an air cleaner mounted to the frame at a position forward of the cab.

4. The utility vehicle of claim 1 and further comprising a battery mounted to the frame at a position forward of the cab.

5. The utility vehicle of claim 1 wherein steering is accomplished by skidding.

6. A utility vehicle, comprising:
   a frame;
   a cab supported by the frame and having an operator station for an operator of the utility vehicle;
   a lift arm carrier mounted to a front end of the frame forward of the cab, the lift arm carrier being configured to receive and pivotally mount each of a plurality of different lift arms, each of the lift arms having a different geometry and wherein the lift arm carrier includes a hydraulic coupler for providing a connection to a power source on the machine to provide pressurized hydraulic fluid to actuators on the lift arm;
   a box coupled to the frame and positioned rearward of the cab; and
   first and second tractive elements each coupled to the frame and positioned on opposite sides of the frame.

7. The utility vehicle of claim 6, wherein the first and second tractive elements are first and second single track tractive elements.

8. The utility vehicle of claim 6, wherein the lift arm carrier is pivotally mounted to the frame.

9. The utility vehicle of claim 6, wherein the lift arm carrier is configured to accept one or more actuators from the lift arm for mounting thereto.

10. A power machine, comprising:
    a frame;
    an operator compartment supported by the frame;
    an engine supported by the frame;
    a traction system operably coupled to the engine and selectively operated to propel the power machine over a support surface;
    first and second operator inputs, each mounted in the operator compartment and each capable of providing a signal for controlling steering of the power machine; and
    a controller in communication with the traction system for controlling operation of the traction system, the controller being configured to communicate with the first operator input and the second operator input, wherein the controller is configured to select one of the first and second operator inputs to the exclusion of the other of the first and second operator inputs for controlling the steering of the power machine, the controller controlling steering based on signals from the selected one operator input regardless of any inputs from the excluded other operator input, wherein the controller selects the one of the first and second operator inputs for controlling the steering of the power machine by sensing which of the first and second operator inputs is in communication with the controller, and when the controller senses that each of the first and second operator inputs is in communication with the controller, the controller selects one of the first and second operator inputs for receiving signals to control the steering of the power machine and ignores signals from the other of the first and second operation inputs.

11. The power machine of claim 10, and further comprising a mode switch in communication with the controller, the mode switch capable, upon actuation, of providing a signal to the controller to select which of the first and second operator inputs to receive steering signals.

12. A method of controlling the steering of a power machine having an operator compartment, comprising:
    selecting from a first operator input and a second operator input, each of which is positioned within the operator compartment and each of which is independently capable of providing a signal to a controller related to steering control of the power machine, a steering control input for receiving steering control input signals from an operator, wherein when the controller senses that each of the first operator input and second operator input is in communication with the controller, the controller selects one of the first operator input and the second operator input as the steering control input for receiving the steering control input signals to control the steering of the power machine and ignores signals from the other of the first operator input and the second operator input;

receiving the steering control input signals from the selected steering control input; and providing a steering control signal from the controller to a traction system to steer the power machine based on the received steering control input signals from the selected one of the first operator input and the second operator input and wherein the controller ignores signals from the other one of the first operator input and the second operator input.

13. The method of claim 12, and further comprising:

receiving a mode input to select the one of the first operator input and the second operator input for receiving the steering control input signals.

14. The method of claim 12 and further comprising:

selecting the other of the first operator input and the second operator input as the steering control input for receiving the steering control input signals from the operator; and wherein receiving the steering control input signals from the selected control input includes receiving the steering control input signals from the newly selected steering control input.

15. The method of claim 12, wherein selecting from the first operator input and second operator input includes selecting from a joystick and a steering wheel.

\* \* \* \* \*